(12) United States Patent
Walker, Jr. et al.

(10) Patent No.: US 7,858,547 B2
(45) Date of Patent: Dec. 28, 2010

(54) CERAMIC WITH IMPROVED HIGH TEMPERATURE ELECTRICAL PROPERTIES FOR USE AS A SPARK PLUG INSULATOR

(75) Inventors: William John Walker, Jr., Toledo, OH (US); John William Hoffman, Perrysburg, OH (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1042 days.

(21) Appl. No.: 11/642,210

(22) Filed: Dec. 20, 2006

(65) Prior Publication Data
US 2007/0123412 A1   May 31, 2007

Related U.S. Application Data

(63) Continuation-in-part of application No. 10/984,135, filed on Nov. 9, 2004, now Pat. No. 7,169,723.

(60) Provisional application No. 60/519,395, filed on Nov. 12, 2003.

(51) Int. Cl.
*C04B 35/111* (2006.01)
*H01T 13/38* (2006.01)
(52) U.S. Cl. .................. 501/128; 501/127; 501/153
(58) Field of Classification Search .................. 501/127, 501/128, 153; 313/118–145
See application file for complete search history.

(56) References Cited

U.S. PATENT DOCUMENTS

| | | | |
|---|---|---|---|
| 3,502,595 A | 3/1970 | Johnson et al. | |
| 3,615,763 A | 10/1971 | Flock | |
| 3,627,547 A | 12/1971 | Bailey | |
| 3,929,496 A * | 12/1975 | Asano et al. | 501/134 |
| 4,552,852 A | 11/1985 | Manning | |
| 4,582,813 A | 4/1986 | Kanda et al. | |
| 4,601,991 A | 7/1986 | Ando et al. | |
| 4,751,207 A | 6/1988 | Manniing | |
| 4,760,038 A | 7/1988 | Kinney, Jr. et al. | |
| 4,879,260 A | 11/1989 | Manning | |
| RE34,028 E | 8/1992 | Manning | |
| 5,147,833 A | 9/1992 | Manning et al. | |
| 5,183,610 A | 2/1993 | Brog et al. | |
| 5,273,474 A | 12/1993 | Oshima et al. | |
| 5,279,779 A | 1/1994 | Fitch | |
| 5,279,886 A | 1/1994 | Kawai et al. | |
| 5,424,257 A | 6/1995 | Schat et al. | |
| 5,545,495 A | 8/1996 | Kato | |
| 5,589,426 A * | 12/1996 | Iwasaki et al. | 501/32 |
| 5,744,412 A | 4/1998 | Pearson et al. | |
| 5,753,893 A | 5/1998 | Noda et al. | |
| 5,830,816 A | 11/1998 | Burger et al. | |
| 5,950,937 A | 9/1999 | Iwai et al. | |

(Continued)

FOREIGN PATENT DOCUMENTS

BR    8602433    * 12/1987

(Continued)

*Primary Examiner*—Karl E Group
(74) *Attorney, Agent, or Firm*—Robert L. Stearns; Dickinson Wright, PLLC

(57) ABSTRACT

An insulator including alumina in an amount between about 90 and about 99% by weight and an oxide mixture or glass mixture including Boron Oxide, Phosphorus Oxide, or both Boron and Phosphorus Oxide.

11 Claims, 10 Drawing Sheets

U.S. PATENT DOCUMENTS

| | | |
|---|---|---|
| 6,069,105 A | 5/2000 | Yamamoto et al. |
| 6,159,885 A | 12/2000 | Mizuno et al. |
| 6,239,052 B1 | 5/2001 | Fukushima |
| 6,265,816 B1 | 7/2001 | Ito et al. |
| 6,399,528 B1 | 6/2002 | Krell et al. |
| 6,559,579 B2 | 5/2003 | Ito et al. |
| 6,566,792 B2 * | 5/2003 | Nishikawa .................. 313/118 |
| 6,576,580 B2 | 6/2003 | Gaubil et al. |
| 6,765,340 B2 * | 7/2004 | Nishikawa et al. .......... 313/143 |
| 2003/0122462 A1 | 7/2003 | Nishikawa et al. |
| 2005/0110382 A1 | 5/2005 | Walker |

FOREIGN PATENT DOCUMENTS

| | | |
|---|---|---|
| DE | 4215939 A1 | 11/1993 |
| EP | 1274157 B1 | 6/2005 |
| JP | 53 126008 A | 11/1978 |
| JP | 1 143368 A | 6/1989 |
| JP | 1-242461 | 9/1989 |

* cited by examiner

CERAMIC WITH IMPROVED HIGH TEMPERATURE ELECTRICAL PROPERTIES FOR USE AS A SPARK PLUG INSULATOR

CROSS-REFERENCE TO RELATED PATENT APPLICATIONS

This application is a continuation-in-part of U.S. patent application Ser. No. 10/984,135, filed on Nov. 9, 2004, now U.S. Pat. No. 7,169,723 which claims priority to U.S. Provisional Patent Application Ser. No. 60/519,395, filed on Nov. 12, 2003, each of which are hereby incorporated herein by reference in their entirety.

BACKGROUND OF THE INVENTION

1. Technical Field

The present invention generally relates to ceramic materials. More particularly, it relates to ceramic materials used in insulators of spark plugs.

2. Related Art

Spark plugs, glow plugs, and other such devices used in internal combustion engines are subjected to high temperature environments in the region of about 1,000° C. In general, a spark plug is a device that extends into a combustion chamber of an internal combustion engine and produces a spark to ignite a combustible mixture of air and fuel therein. Specifically, a spark plug typically includes a cylindrical metal shell having external threads that screw into a portion of the engine and further having a hook-shaped ground electrode attached thereto at a firing end of the spark plug. A cylindrical insulator is disposed partially within the metal shell, and extends axially beyond the metal shell toward the firing end and also toward a terminal end. A conductive terminal is disposed within a cylindrical insulator at the terminal end of the spark plug opposite the firing end. At the firing end, a cylindrical center electrode is disposed within the insulator and projects axially out of the insulator toward the ground electrode, whereby a spark plug gap is defined between the electrodes.

In operation, ignition voltage pulses of up to about 40,000 volts are applied through the spark plug to the center electrode, thereby causing a spark to jump the gap between the center and ground electrodes. The spark ignites an air and fuel mixture within the combustion chamber to create high temperature combustion to power the engine. Unfortunately, the high voltage and high temperature environment within the combustion chamber can degrade components of the spark plug. As the spark plug becomes degraded, the intensity of the ignition pulse may become altered, thereby degrading the quality of the spark. Degradation of the spark plug may be caused by dielectric puncture through the insulator which establishes an alternative electric path and consequently the spark may not reliably jump the gap between the center and ground electrodes. The quality of the spark effects the ignition of the mixture of the air and fuel (i.e., the combustion efficiency, combustion temperature, combustion products) thus, the power output, fuel efficiency performance of the engine, and the emissions produced by the combustion of the air and fuel may be adversely affected. Due to an increasing emphasis on regulation of emissions from motor vehicles, the increasing fuel prices, and modern performance demands, it is desirable to maintain a high quality spark for consistent engine performance and emission quality. The longevity of the spark plug, including, quality of the spark, is determined by several factors including the composition of the ceramic insulator material.

The ceramic insulator materials used for the insulator are dielectric materials. Dielectric strength of a material is generally defined as the maximum electric field which can be applied to the material without causing breakdown or electrical puncture thereof. The dielectric strength of spark plugs is generally measured in kilovolts per mil (kV/mil). For a given spark plug design, the insulator dimensions are fixed, thus, dielectric strength is frequently expressed as a breakdown voltage in kV, rather than in kV/mil. A typical value for spark plug dielectric strength for a standard spark plug design used in many applications is on the order of about 40 kV at room temperature. Dielectric strength of the insulators used in spark plugs is also a function of temperature. High temperatures cause an increase in the mobility of certain ions allowing the current to more easily leak through the ceramic. Any leakage of current leads to localized heating which gradually degrades the resistance of the material to dielectric puncture. It has been observed that resistance of insulators to dielectric breakdown tends to decrease over the life of a spark plug due to thermal stress on the spark plug cycling under an applied electric field and due to attendant thermal-electrical fatigue thereof. The exact nature of the microstructural and/or compositional changes are not completely understood, but are believed to be associated with localized heating to temperatures sufficient to bring about partial melting of the ceramic material.

Shunt resistance is another measurable property of ceramics, particularly for those used in spark plugs, and is a measure of the electrical resistance of the material which is generally measured in megaohms. A typical value for spark plug shunt resistance is on the order of about 75 to 125 megaohms at an operating temperature of about 1000 degrees Fahrenheit. Shunt resistance is typically measured on a spark plug as an electrical resistance of the ceramic insulator between the center electrode and metal shell of the spark plug. Therefore, shunt resistance is indicative of the amount of current leakage through the ceramic insulator between the center electrode and metal shell or housing. Whereas dielectric breakdown tends to be a sudden event, shunt resistance tends to be a continuous, parasitic loss of electrical power. Of course, the lower the shunt resistance, the higher the likelihood of catastrophic dielectric failure after the spark plug.

A breakdown in dielectric strength and/or shunt resistance ultimately leads to a spark plug with an electrically parallel path between the center electrode and metal casing in addition to the path across the spark gap between the center electrode and the ground electrode. Shunting of the spark plug is a condition in which an undesirable parallel conductive path is established between the center electrode and the metal casing in addition to the path across the spark gap between the center electrode and the ground electrode. However, in the case of shunting caused by diminished or insufficient shunt resistance, the affect is may simply degrade the spark performance. This additional path even if very small has an adverse effect on the quality of the spark generated by the spark plug. Whereas the parallel electric path is generally due to dielectric breakdown, the effect is generally catastrophic and in many cases significantly reducing or completely eliminating the spark between the center electrode and the ground electrode. A diminished or insufficient shunt resistance degrades the performance of the spark plug and consequently the performance of the engine especially over the service lifetime of the spark plug. As stated above, many times, a degraded shunt resistance will eventually cause a catastrophic failure due to dielectric loss.

As manufacturers continually have increased the complexity and reduced the size of internal combustion engines, spark plugs are needed that have a smaller diameter. Also as manufacturers have continually increased the compression ratio of the engine, requiring higher voltages for the spark to jump the spark gap. Currently, the size the spark plug is limited from further reduction due to the required dielectric strength of the insulator over the service lifetime of the plug, which is directly related to the thickness required for the walls of the insulator. Another factor limiting size reduction is that more manufacturers are demanding a longer service lifetime from spark plugs such as requesting 100,000 mile, 150,000 mile, and 175,000 mile service lifetimes from spark plugs. The longer the desired service lifetime, the higher the required dielectric strength. Also, the higher the required voltage, the higher required dielectric strength. Previously to increase the service lifetime or dielectric strength of a spark plug the walls of the insulator were increased in thickness. However, the current demand for more compact spark plugs for modern engines prevents or limits the use of thicker walled insulators. Therefore, as engines shrink in size and as longer service lifetimes and higher voltages are needed in spark plugs, a spark plug having an insulator with an increased dielectric strength and a reduced wall thickness in size is needed.

Therefore, it would be desirable to produce a spark plug using an improved ceramic insulator material with high shunt resistance that is less susceptible to a breakdown in dielectric strength for extended periods of time at high voltages and high temperatures and, thus, less susceptible to shunting conditions in the spark plug, in order to promote generation of a quality spark and enhanced engine performance.

SUMMARY OF THE INVENTION

The above-noted shortcomings of prior art ceramics are overcome by the present invention which provides a ceramic, particularly for use as an insulator in an ignition device such as a spark plug. Such an insulator has improved shunt resistance and dielectric breakdown properties, so as to reduce shunting of the spark plug and thereby improve the quality of the spark generated by the spark plug and improved engine performance.

In the present invention, the dielectric strength and the shunt resistance of a ceramic material, such as a spark plug insulator, is improved through the addition of either Phosphorus Oxide ($P_2O_5$) or Boron Oxide ($B_2O_3$), or a combination of $P_2O_5$ and $B_2O_3$. The additions of $P_2O_5$, $B_2O_3$ or a combination of $P_2O_5$ and $B_2O_3$ to the ceramic are added to the glass phase of the ceramic. The $P_2O_5$ is generally added up to 20% by weight of the glass and the $B_2O_3$ is added up to 15% by weight of the glass. More specifically, $P_2O_3$ is generally added up to 15% by weight and $B_2O_3$ is added up to about 12% by weight. When combined, $P_2O_5$ and $B_2O_3$ are added up to about 27% by weight of the glass, and more specifically about 18% by weight of the glass. The dielectric strength has been found to increase by up to 5% and the shunt resistance by up to 200% through the addition of $P_2O_5$, $B_2O_3$ or both $P_2O_5$ and $B_2O_3$.

According to one aspect of the present invention, the ceramic includes alumina in an amount between about 90 and about 99% by weight, a zirconium containing compound in an amount between about 0.01% and about 1% by weight, and an oxide mixture in an amount which ranges between about 1 and about 10% by weight. The zirconium containing compound preferably comprises zirconium oxide ($ZrO_2$). The oxide mixture includes a glass former and a network modifier, wherein the molar ratio of the glass former to the network modifier is in a range between about 0.8:1 and 1.2:1. The glass former may comprise $SiO_2$. The network modifiers may comprise at least one of MgO, CaO, SrO, BaO, $Na_2O$, $K_2O$ and $Li_2O$.

According to another aspect of the present invention, there is provided a spark plug that includes a center electrode, a metal shell, and an insulator disposed between the center electrode and the metal shell. The insulator includes between about 90 and 99% alumina by weight, between about 0.01 and 1% zirconium containing compound by weight, and between about 1 and 10% oxide mixture by weight. The oxide mixture includes a glass former, and a network modifier, wherein the molar ratio of the glass former to the network modifier range between about 0.8:1 and 1.2:1. The glass former may comprise $SiO_2$. The network modifiers may comprise at least one of MgO, CaO, SrO, BaO $Na_2O$, $K_2O$ and $Li_2O$.

In accordance with yet another aspect of the present invention, there is provided a spark plug including a metal shell, a center electrode, and an insulator disposed in the metal shell and having a central bore with the center electrode being disposed in the central bore. The insulator includes alumina and has a shunt resistance of greater than 1000 megaohms at 1000 degrees Fahrenheit.

In accordance with another aspect of the present invention, there is provided a ceramic material, such as a spark plug insulator having approximately 90-99% alumina by weight and a glass including Phosphorus Oxide of about 0.05% or greater by weight of the ceramic material.

In accordance with another aspect of the invention, the present invention includes an insulator for a spark plug having approximately 90-99% alumina by weight and a glass including Boron Oxide of about 1.5% or greater by weight of the glass.

In accordance with another aspect of the present invention, there is provided an insulator for a spark plug having approximately 90-99% alumina by weight and a glass including Phosphorus Oxide of about 0.05% or greater and Boron Oxide of about 1.5% or greater by weight of the glass.

BRIEF DESCRIPTION OF THE DRAWINGS

These and other features and advantages of the present invention will become more readily appreciated when considered in connection with the following detailed description and appended drawings, wherein like designations denote like elements, and wherein.

DETAILED DESCRIPTION OF THE PREFERRED EMBODIMENT

Figure 1:
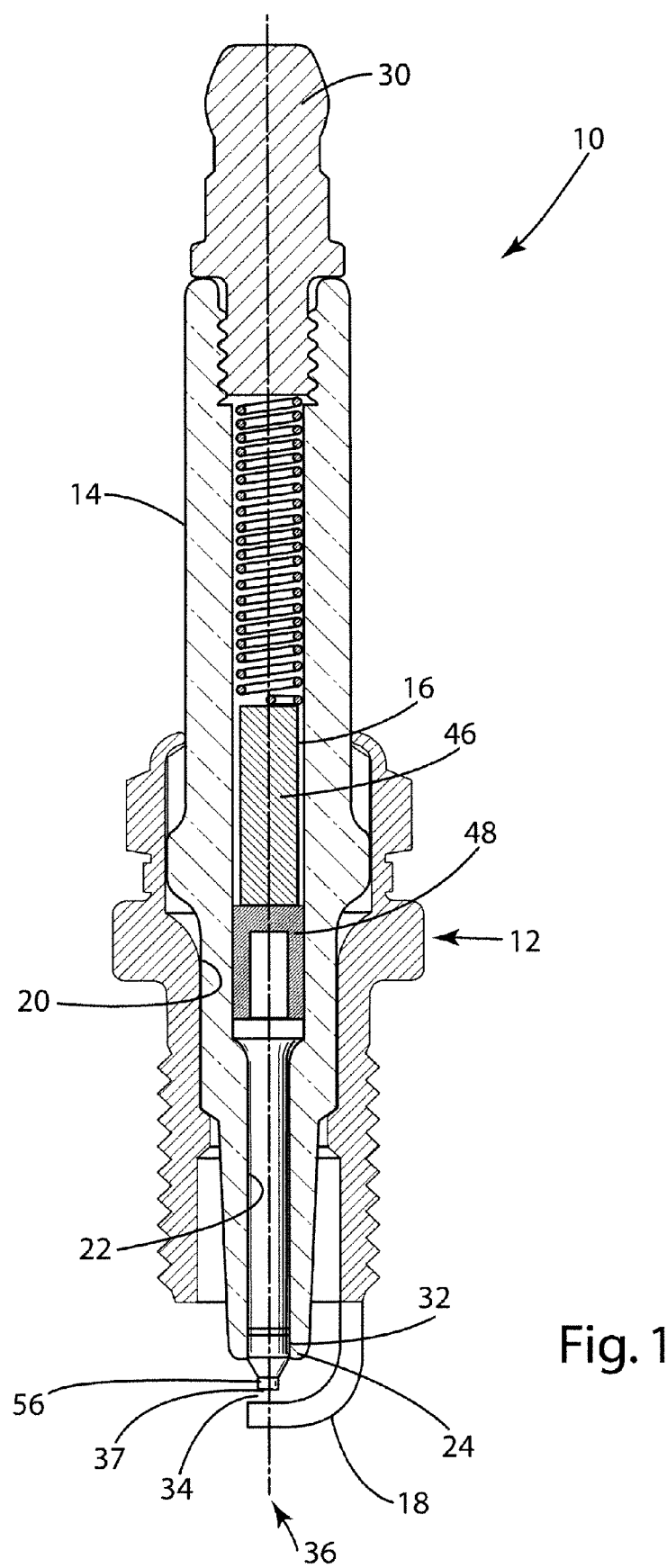
FIG. 1 shows a partial fragmentary view of a spark plug having a ceramic insulator in accordance with the present invention.

The present invention relates generally to ignition devices for high temperature applications, such as spark plugs, igniters and other spark generation devices. With reference to FIG. 1, there is shown an ignition device comprising a spark plug assembly 10 for use in an internal combustion engine (not shown) that generally includes a metal shell 12, a ceramic insulator 14, a center wire assembly 16, and a ground electrode 18. As commonly known in the art, the shell 12 is a generally cylindrical, electrically conductive component having a hollow bore 20 extending along its axial length. Within that bore 20 are a series of circumferential shoulders sized to support diametrically reduced sections of the insulator 14. Like the shell 12, the insulator 14 is also a generally cylindrical component with an elongated axial bore 22. The lower axial end of the insulator 14 comprises a nose portion 24 which generally extends out of and beyond the lowermost portion of the shell 12. The insulator axial bore 22 is designed to receive the electrically conductive center wire assembly 16, which extends the entire axial length of the spark plug 10 and generally includes a terminal electrode 30 at one end and a center electrode 32 at another end. Of course, the center wire assembly 16 shown here is simply of a typical embodiment, and could include additional components or have components omitted. The ground electrode 18 is both mechanically and electrically connected to the lower axial end of the shell 12 and is generally formed in an L-shape configuration. The exposed end of the center electrode 32 and a side surface of the ground electrode 18 oppose each other and thereby define a spark gap 34 at a firing end 36 of the spark plug 10.

In operation, the terminal electrode 30 receives a high voltage ignition pulse from an ignition system (not shown) which travels along the center wire assembly 16 until it reaches the lower exposed end of the center electrode 32. If the pulse has sufficient energy to bridge the spark gap 34, a spark is formed between the center electrode 32 and the ground electrode 18, which in turn is grounded to the engine via the shell 12. The spark ignites a fuel/air mixture which has previously been injected into a combustion chamber within the engine, which in turn initiates the combustion process used to power the engine. The previous explanation was provided as a general overview of the construction and operation of the ignition device. Additional detail about ceramic insulator 14 is provided in accordance with the present invention.

Insulator 14 of the present invention is an alumina-based ceramic. In general, alumina-based ceramics comprise fine crystalline $Al_2O_3$ particles in an oxide mixture matrix. The oxide mixture is preferably a generally amorphous glass matrix, such as various types of silicate glasses, but may also include crystalline materials as part of the oxide mixture. Alumina-based ceramics tend to have relatively high mechanical and dielectric strength, as well as high electrical resistivity and low dielectric loss, and are known to retain these properties over a relatively wide temperature range. But, the properties of alumina ceramics are degraded by impurities in the material, thermal fatigue, high voltage, high operating temperatures, and the like. U.S. Pat. No. 4,879,260 of Manning indicates that the addition of zirconia to an alumina-based ceramic tends to positively affect the mechanical strength thereof, particularly when the zirconia comprises between 0.5 to 1.0 percent of the composition by weight.

A focus of the present invention, however, is not to improve mechanical strength of an alumina-based ceramics, but rather to provide a ceramic insulator with improved dielectric strength and shunt resistance, such that it is particularly adapted for use in ignition devices. To this end, experiments were conducted that involved varying the amounts of alumina, the materials and related amounts that comprise the oxide mixture matrix, and the amounts of zirconia to obtain alumina-based ceramics having a combination of improved dielectric strength or shunt resistance, or both. The amount of alumina was discovered to be preferably between 90 and 99% of the ceramic composition by weight. The oxide mixture matrix is composed of a glass former, which is preferably $SiO_2$ but may also include $B_2O_3$, $P_2O_5$, and the like. The oxide mixture matrix is also composed of one or more network modifiers, preferably CaO, MgO, BaO, and SrO, but may also include other alkaline earth metal oxides, or alkali metal oxides such as $Na_2O$, $K_2O$, $Li_2O$ and the like. The network modifiers may also be known as fluxes. The oxide matrix may also be composed of network intermediates, such as $Al_2O_3$, but may also include other network intermediates such as $TiO_2$, ZnO, $ZrO_2$ and the like. Since $Al_2O_3$ is somewhat soluble in the oxide mixture, an equilibrium will exist between the primary $Al_2O_3$ constituent in the form of $Al_2O_3$ crystals and $Al_2O_3$ which is dissolved in the oxide mixture where it acts as a network intermediate. The amount of $Al_2O_3$ that is dissolved in the oxide mixture is very difficult to measure analytically, but based on the phase equilibrium diagram is believed to constitute was much as 40% of the oxide mixture by weight for compositions in the range of the present invention. It was discovered that adding certain relatively small levels of a zirconium-based compound, such as zirconia ($ZrO_2$), tends to reduce crystallization within the oxide matrix, as well as improve mechanical strength of the ceramic. Crystallization tends to result in higher electrical conductivity. Therefore, the addition of the zirconia tends to lower the electrical conductivity of the oxide mixture matrix portion of the ceramic.

Experiments were conducted to determine the effect of ceramic material composition on the performance of spark plug insulators. The ceramics were prepared by mixing Alcan C-761 alumina with appropriate amounts of commercially available precursor oxide mixture matrix materials, such as EPK kaolin, HuberCarb calcium carbonate, magnesite, dolomite, wollastonite and Yellowstone Talc, and with appropriate amounts of Zirox Zirconia which form oxides upon heating. The powder mixture constituents used to produce ceramic insulator materials of the invention were ball milled in an aqueous slurry comprising about 73 percent solids by weight or about 40 percent solids by volume. Batches totaling 5000 grams of powder were prepared by ball milling of the materials, followed by spray drying in a tower spray-dryer. The spray granulate was then compacted by dry-bag isostatic pressing at 8500 psi and formed into the shape of insulator 14, and fired at temperatures between 1590 and 1630 degrees Celsius for approximately 3 hours in order to sinter the insulators such that the alumina particles are interconnected by the oxide mixture matrix.

The experiments were designed to evaluated three different levels of four variables of material composition. Table 1 below depicts a summary of the variables used in the experiment. The various material compositions specified herein are for purposes of illustrating and disclosing the present invention, and are not to be construed as limiting the scope thereof.

The experiments were conducted using nine different batches of material that are identified as batches 03-B-17 through 03-B-25.

TABLE 1

| Variable (Material) | Description | Levels | Values of Levels |
|---|---|---|---|
| Alumina | Weight Percent of Alumina | 3 | 94%, 95%, 96% |
| Zirconia | Weight Percent of Zirconia | 3 | 0.0%, 0.15%, 0.30% |
| CaO | Mole Fraction CaO/(RO) | 3 | 0.8, 0.9, 1.0 |
| SiO2 | Mole Fraction SiO$_2$/(RO) | 3 | 0.8, 1.0, 1.2 |

The network modifiers can be identified in general by the designation RO, wherein RO represents the total amount of network modifier present in the ceramic composition. In Table 1, RO=MgO+CaO. In general, RO is the sum of all network modifiers present. If the network modifiers include CaO, MgO, BaO and SrO, then RO=CaO+MgO+BaO+SrO.

The material compositions of the various batches are reported in a combination of weight percents and molar amounts. The composition of the oxide matrix is reported herein in molar amounts because of the degree of variation in the atomic weights of the network modifiers that may be used in the present invention. The ratio of atoms in the oxide mixture matrix greatly influences the electrical properties thereof. Since the atomic weights of calcium, magnesium, barium, and strontium vary significantly, they cannot be readily substituted on a weight basis to achieve the specific compositions of network modifiers discussed herein. Thus, it is preferred to express the components of the oxide mixture matrix in terms of moles rather than in terms of weight.

Accordingly, Table 2A is an experiment matrix that reports the various experiment and composition levels used for each material in weight percent for alumina and zirconia, and in molar ratio for the preferred network modifiers and glass formers. Table 2B, however, reports all of the materials in weight percent. Similarly, Table 2C reports in weight percent, the precursor materials, by batch composition.

TABLE 2A

| Batch ID | Run Order | DOE Order | Al$_2$O$_3$ wt % | ZrO$_2$ wt % | MgO mol | CaO mol | SiO$_2$ mol |
|---|---|---|---|---|---|---|---|
| 03-B-24 | 8 | 1 | 94.00 | 0.00 | 0.20 | 0.80 | 0.80 |
| 03-B-19 | 3 | 2 | 95.00 | 0.15 | 0.10 | 0.90 | 0.80 |
| 03-B-17 | 1 | 3 | 96.00 | 0.30 | 0.00 | 1.00 | 0.80 |
| 03-B-20 | 4 | 4 | 94.00 | 0.30 | 0.10 | 0.90 | 1.00 |
| 03-B-23 | 7 | 5 | 95.00 | 0.00 | 0.00 | 1.00 | 1.00 |
| 03-B-22 | 6 | 6 | 96.00 | 0.15 | 0.20 | 0.80 | 1.00 |
| 03-B-25 | 9 | 7 | 94.00 | 0.15 | 0.00 | 1.00 | 1.20 |
| 03-B-21 | 5 | 8 | 95.00 | 0.30 | 0.20 | 0.80 | 1.20 |
| 03-B-18 | 2 | 9 | 96.00 | 0.00 | 0.10 | 0.90 | 1.20 |
| | | Minimum | 94.00 | 0.00 | 0.00 | 0.80 | 0.80 |
| | | Maximum | 96.00 | 0.30 | 0.20 | 1.00 | 1.20 |

TABLE 2B

| Batch ID | Run Order | DOE Order | Al$_2$O$_3$ wt % | ZrO$_2$ wt % | MgO wt % | CaO wt % | SiO$_2$ wt % |
|---|---|---|---|---|---|---|---|
| 03-B-24 | 8 | 1 | 94.00 | 0.00 | 0.48 | 2.67 | 2.86 |
| 03-B-19 | 3 | 2 | 95.00 | 0.15 | 0.19 | 2.39 | 2.27 |
| 03-B-17 | 1 | 3 | 96.00 | 0.30 | 0.00 | 1.99 | 1.71 |
| 03-B-20 | 4 | 4 | 94.00 | 0.30 | 0.20 | 2.51 | 2.99 |
| 03-B-23 | 7 | 5 | 95.00 | 0.00 | 0.00 | 2.41 | 2.59 |
| 03-B-22 | 6 | 6 | 96.00 | 0.15 | 0.27 | 1.53 | 2.05 |
| 03-B-25 | 9 | 7 | 94.00 | 0.15 | 0.00 | 2.56 | 3.29 |
| 03-B-21 | 5 | 8 | 95.00 | 0.30 | 0.30 | 1.69 | 2.71 |
| 03-B-18 | 2 | 9 | 96.00 | 0.00 | 0.13 | 1.59 | 2.28 |
| | | Minimum | 94.00 | 0.00 | 0.00 | 1.53 | 1.71 |
| | | Maximum | 96.00 | 0.30 | 0.48 | 2.67 | 3.29 |

TABLE 2C

| Batch ID | Run Order | DOE Order | Yellow-stone Talc | Huber-Carb Calcium Carbonate | EPK Kaolin | Alcan C-761 Alumina | ZIROX Zirconia |
|---|---|---|---|---|---|---|---|
| 03-B-24 | 8 | 1 | 1.59 | 4.91 | 4.50 | 89.00 | 0.00 |
| 03-B-19 | 3 | 2 | 0.63 | 4.41 | 4.28 | 90.53 | 0.15 |
| 03-B-17 | 1 | 3 | 0.00 | 3.68 | 3.73 | 92.28 | 0.30 |
| 03-B-20 | 4 | 4 | 0.67 | 4.68 | 5.86 | 88.49 | 0.30 |
| 03-B-23 | 7 | 5 | 0.00 | 4.50 | 5.70 | 89.80 | 0.00 |
| 03-B-22 | 6 | 6 | 0.92 | 2.83 | 3.49 | 92.62 | 0.15 |
| 03-B-25 | 9 | 7 | 0.00 | 4.82 | 7.32 | 87.71 | 0.15 |
| 03-B-21 | 5 | 8 | 1.02 | 3.14 | 4.87 | 90.66 | 0.30 |
| 03-B-18 | 2 | 9 | 0.43 | 2.97 | 4.56 | 92.05 | 0.00 |
| | | Minimum | 0.00 | 2.83 | 3.49 | 87.71 | 0.00 |
| | | Maximum | 1.59 | 4.91 | 7.32 | 92.62 | 0.30 |

Insulators 14 were produced using the above-described material compositions. The insulators were tested for their resistance to dielectric puncture. In order to test the dielectric puncture resistance, the insulators were placed in a fixture comprising a center electrode that passed through the axial bore of the insulator. A ground electrode was placed around the exterior surface of the insulator at a point where the thickness of the insulator was about 0.100 inches. The test fixture and insulator were immersed in a dielectric fluid to prevent arcing of the electric current around the insulator. A Hipotronics dielectric tester was used to apply a 60 Hertz alternating current electrical field to the insulator. Voltage was ramped at a rate of 200 volts per second until dielectric puncture of the insulator occurred. The peak voltage at the time of failure was reported as the dielectric puncture voltage. The results of the testing are set forth in Table 3 below.

TABLE 3

| Composition | Voltage kV | | | | | | | | |
| --- | --- | --- | --- | --- | --- | --- | --- | --- | --- |
| | 03-B-17 | 03-B-18 | 03-B-19 | 03-B-20 | 03-B-21 | 03-B-22 | 03-B-23 | 03-B-24 | 03-B-25 |
| Average | 40.9 | 36.9 | 37.8 | 35.1 | 37.8 | 39.3 | 39.2 | 34.5 | 34.9 |
| Standard Deviation. | 1.7 | 2.0 | 2.5 | 1.7 | 3.0 | 3.0 | 2.1 | 1.8 | 4.1 |
| Minimum | 37.6 | 33.2 | 32.5 | 32.4 | 32.1 | 30.8 | 31.4 | 31.5 | 19.2 |
| Maximum | 45.1 | 43.0 | 45.2 | 39.0 | 47.9 | 44.3 | 43.8 | 39.9 | 39.0 |
| No. Specimens | 60 | 58 | 28 | 26 | 44 | 38 | 60 | 51 | 30 |

Figure 2:
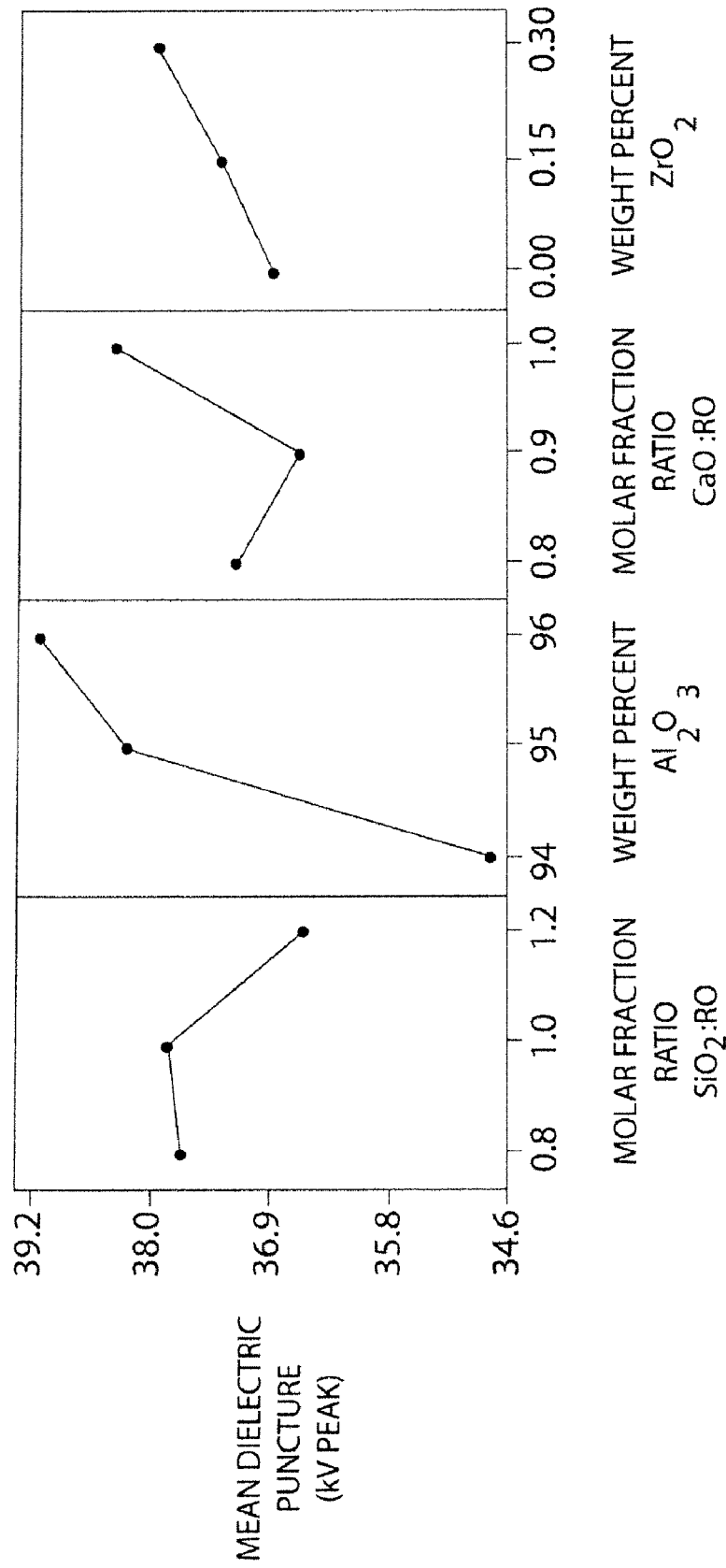
FIG. 2 is a main effects plot of mean dielectric peak puncture values for several material composition variables of the ceramic of the present invention.

A main effects plot of mean dielectric puncture values is illustrated in FIG. 2 in terms of kilovolts. As can be seen, the plot of $Al_2O_3$ content reveals the most significant increase in resistance to dielectric puncture over the three levels of the $Al_2O_3$ variable. Accordingly, the amount of alumina is believed to be the variable with the most significant effect on dielectric puncture. In general, higher alumina content in the ceramic tends to result in higher dielectric puncture values, and vice-versa. In other words, the data reveal that increases in resistance to dielectric puncture of the ceramic are most dependent upon increases in the quantity of alumina. Other variables, such as the $SiO_2$:RO ratio (RO being in this instance CaO+MgO), the CaO:RO ratio, and the amount of zirconia are not believed to have as significant of an effect on dielectric puncture. However, since no maxima or minima was observed with regard to the effect of the zirconia content, and puncture performance improved with increasing zirconia content, it is believed that zirconia content including higher zirconia contents than those tested, may provide a useful means for improving the dielectric puncture performance of these ceramics. It is believed that a dielectric puncture threshold of over 41 kilovolts may be repeatably achieved with the ceramic formulations of the present invention.

The insulators were also tested for shunt resistance at 1,000 degrees Fahrenheit. In order to measure shunt resistance, the insulators were assembled into spark plugs and the ground electrodes were removed. The spark plugs were mounted in a fixture comprising an electrically grounded Inconel plate with threaded holes to receive the shells of the spark plugs and the fixture was placed into an electric furnace. Electrodes were placed on the terminals of each spark plug, with leads that passed through the door of the furnace. The furnace was heated to a temperature of 1000 degrees Fahrenheit and the resistance of each spark plug was measured between the electrically grounded Inconel plate and the terminal lead using a Keithley electrometer model number 6517A. The results of the shunt resistance testing are shown below in Table 4 and reported in megaohms.

TABLE 4

| Batch | Specimen #1 | Specimen #2 | Specimen #3 | Average |
| --- | --- | --- | --- | --- |
| 03-B-17 | 2970 | 3840 | 2130 | 2980 |
| 03-B-18 | 898 | 1080 | 1740 | 1239 |
| 03-B-19 | 2060 | 3790 | 3390 | 3080 |
| 03-B-20 | 4920 | 11800 | 2530 | 6417 |
| 03-B-21 | 1050 | 8840 | 2700 | 4197 |
| 03-B-22 | 9900 | 3880 | 4880 | 6220 |
| 03-B-23 | 3550 | 2640 | 4380 | 3523 |
| 03-B-24 | 2630 | 482 | 2550 | 1887 |
| 03-B-25 | 2230 | 1020 | 3690 | 2313 |

Figure 3:
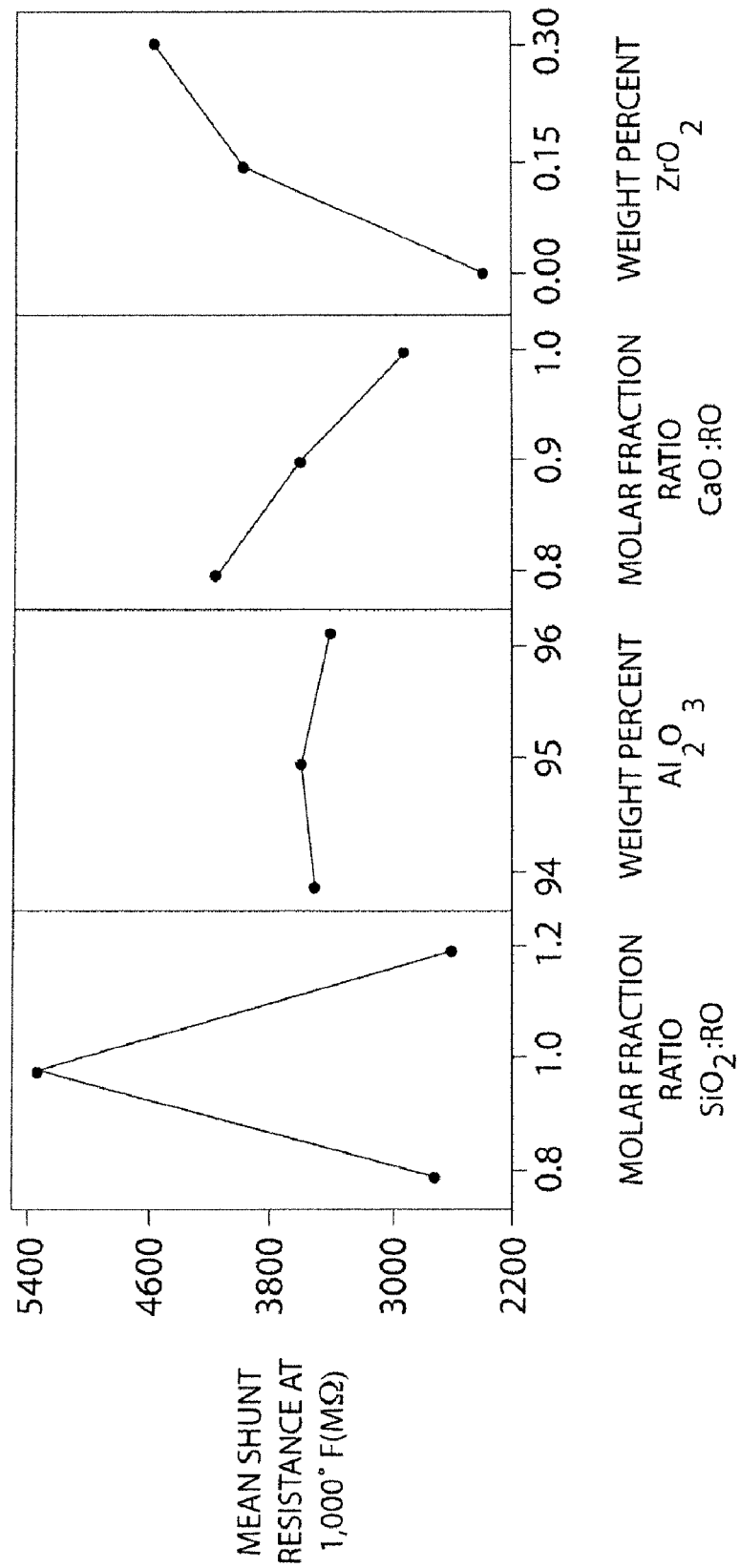
FIG. 3 is a main effects plot of mean shunt resistance values for several material composition variables of the ceramic of the present invention.

A main effects plot of mean shunt resistance values is illustrated in FIG. 3. As can be seen, the plot of shunt resistance as a function of the $SiO_2$ content illustrated in the form of the $SiO_2$ to RO ratio (RO in this instance being CaO+MgO) reveals the most significant effect on shunt resistance. The plot indicates a maximum effect on shunt resistance occurring at a ratio of 1.0. The amount of zirconia is believed to have the second largest effect on shunt resistance, with a maximum at about 0.3 weight percentage, which was the highest zirconia content in the test samples. However, since no clear maxima or minima was observed, it is believed that higher zirconia contents may provide even greater shunt resistance values. The CaO content, illustrated in the plot in the form of the CaO to RO ratio, is believed to have the third largest effect on shunt resistance with a maxima at a ratio of about 0.8. Surprisingly, in direct contrast to the dielectric breakdown testing, the alumina content did not appear to have a significant effect on shunt resistance.

To account for the non-linearity of the $SiO_2$ to RO ratio plot, a multiple regression analysis was performed including an $SiO_2$ squared term for the $SiO_2$ to RO ratio. An initial analysis revealed that $Al_2O_3$ was not statistically significant, so this variable was removed for a final analysis. The results of the final analysis indicated that the R-squared value from the regression was 0.98, indicating that the multiple regression model analysis accounts for 98% of the variability in shunt resistance.

Figure 4:
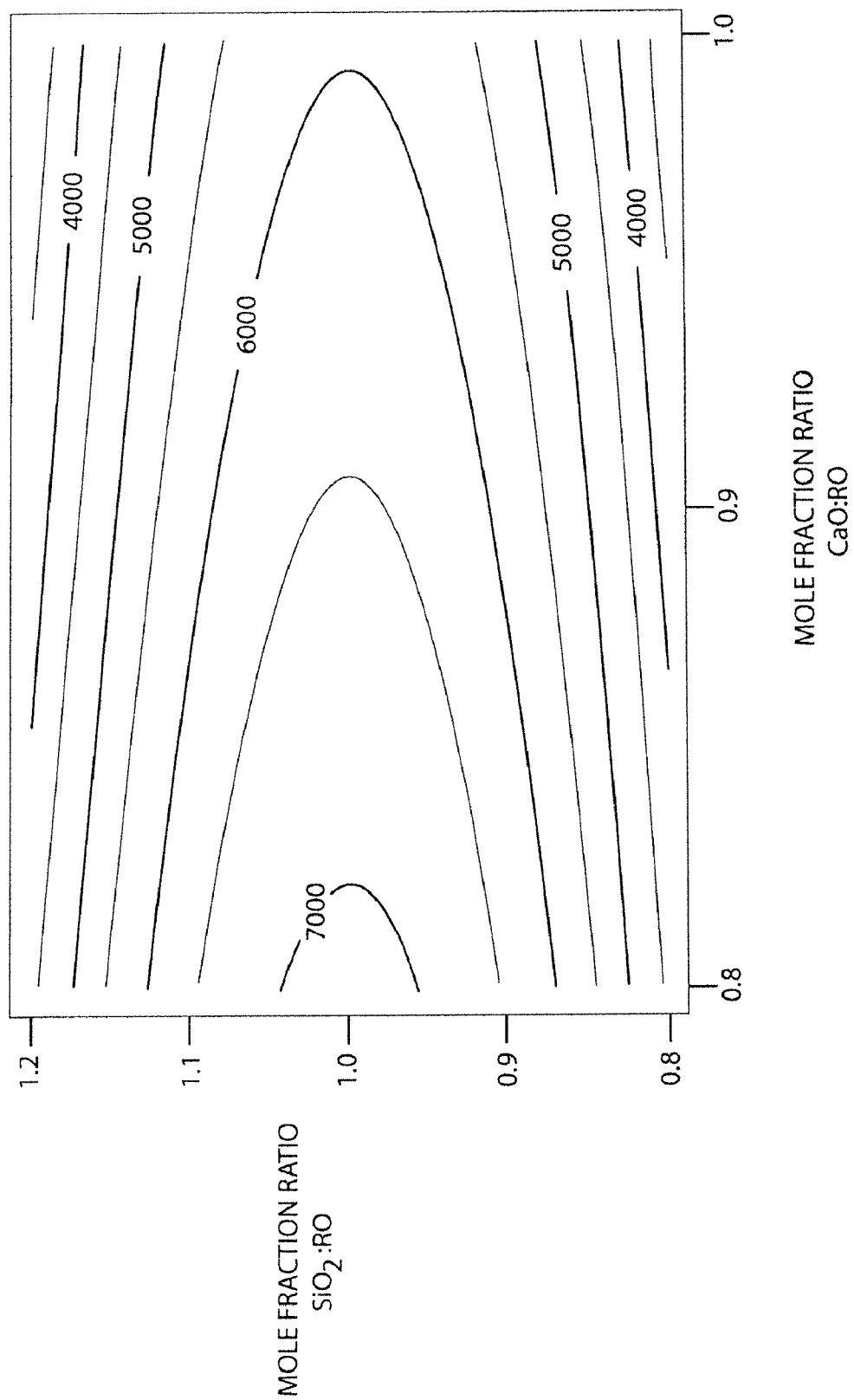
FIG. 4 is a contour plot showing lines of fixed shunt resistance for two material composition variables of the matrix mixture within the ceramic of the present invention.

The influence of the composition of the matrix on the shunt resistance of the ceramic is illustrated as a contour plot in FIG. 4. The contour plot illustrates that shunt resistance, at about 7000 megaohms, is achievable at 1000 degrees Fahrenheit with an $SiO_2$:RO ratio of approximately 1.0 and a CaO:RO ratio of about 0.8. Further, the shunt resistance has more sensitivity to changes in the molar ratio of $SiO_2$:RO than the molar ratio of CaO:RO.

Figure 5:
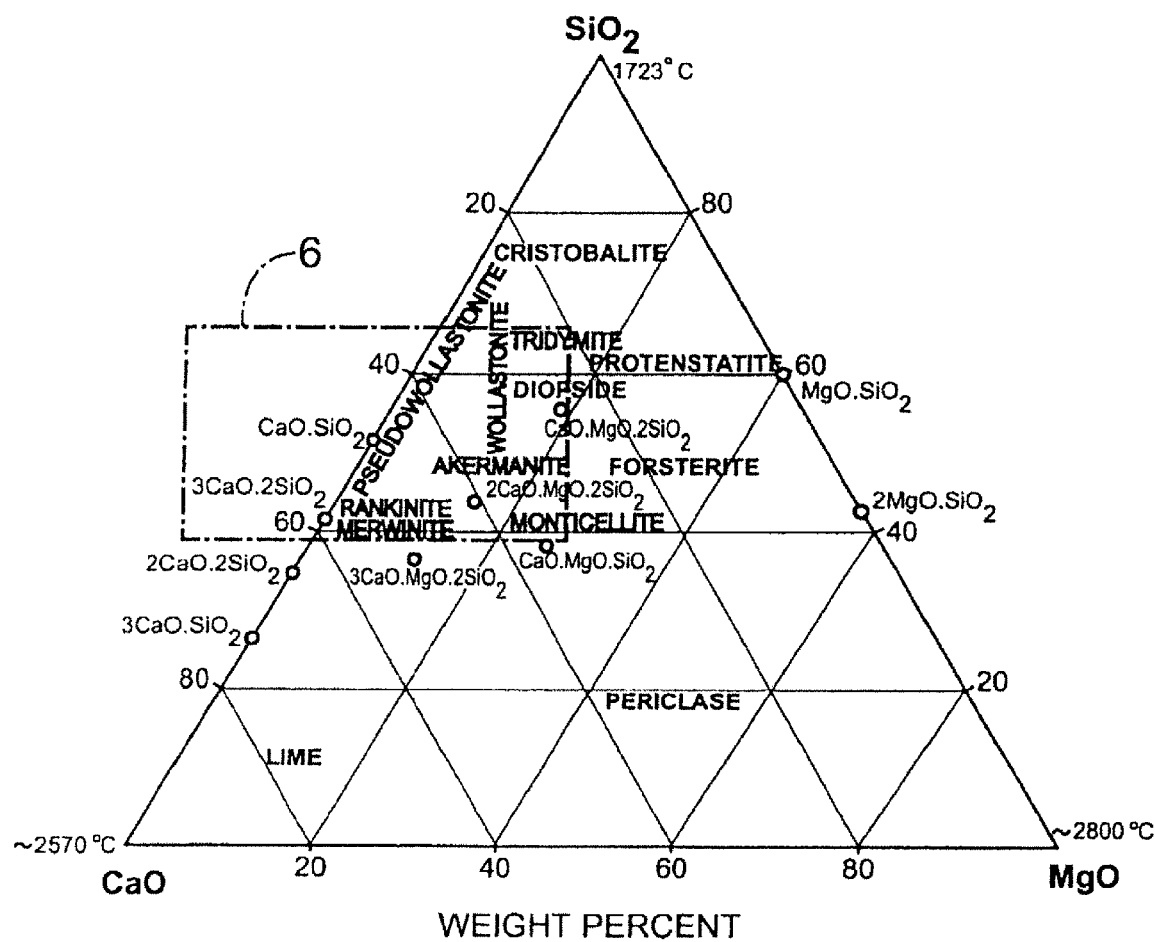
FIG. 5 is a schematic illustration of a CaO—$SiO_2$—MgO phase equilibrium diagram.
Figure 6:
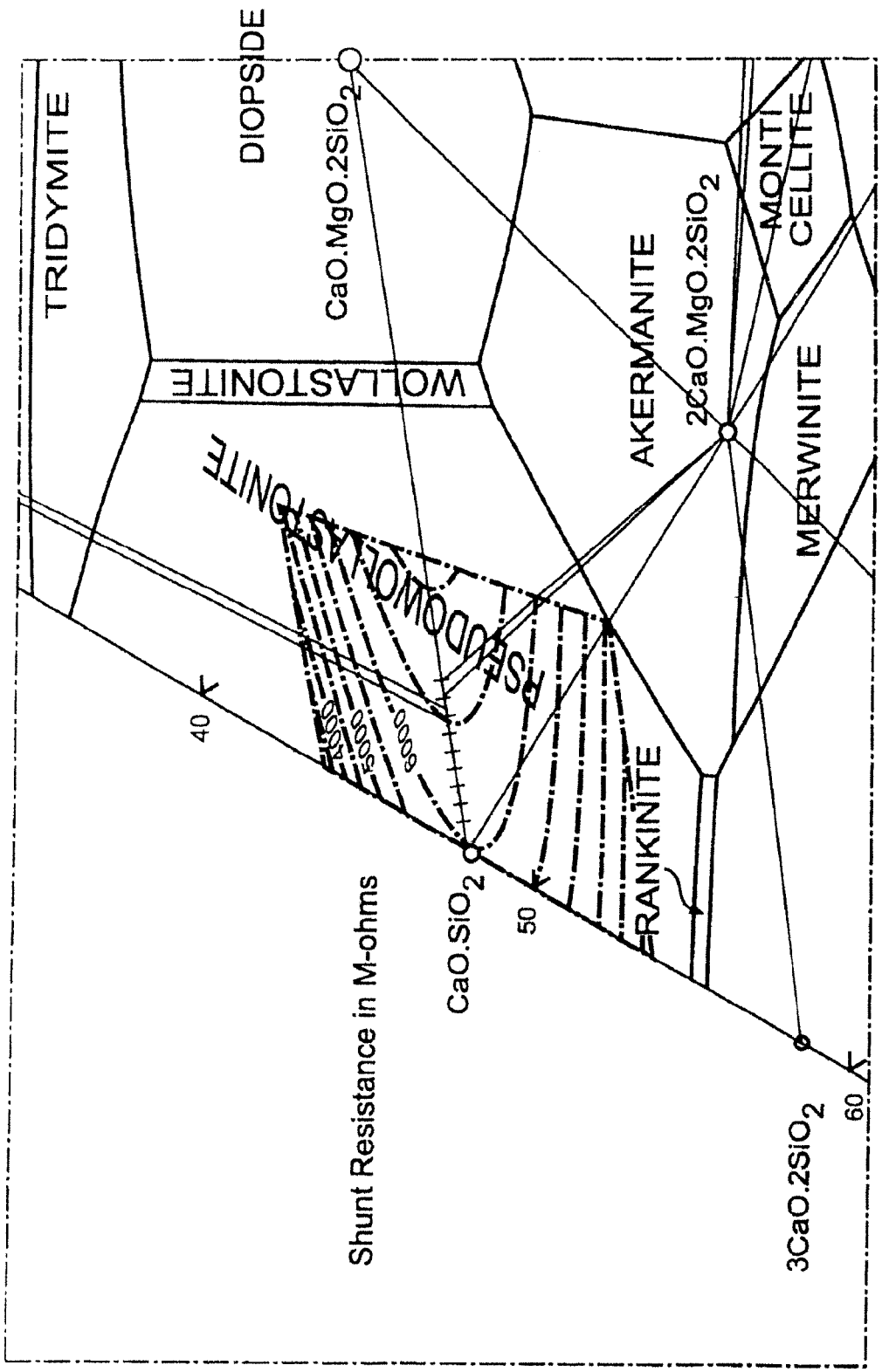
FIG. 6 is a partial illustration of a phase equilibrium diagram for CaO—$SiO_2$—MgO, showing an overlaid contour plot of shunt resistance.

Similarly, FIG. 6 illustrates another contour plot of shunt resistance as a function of the molar ratios of $SiO_2$ and CaO, similar to that of FIG. 4, that is overlaid onto a portion of a phase equilibrium diagram for CaO, $SiO_2$, and MgO. FIG. 5 is a schematic illustration of the CaO, $SiO_2$ and MgO ternary phase diagram illustrating generally the region utilized in conjunction with the compositions of the present invention and described in greater detail in FIG. 6. The phase diagram utilized for the overlay of FIG. 6 is available from the American Ceramics Society, Columbus, Ohio. The left most boundary of the contour plot depicts the left most boundary of the phase equilibrium diagram wherein the amount of CaO and $SiO_2$ are varying as shown and the amount of MgO is zero. The right most boundary of the contour plot is delimited by a CaO to RO molar ratio of about 0.8, wherein 80% of the network modifier includes CaO and 20% of the network modifier includes MgO. The lower and upper boundaries of the contour plot depict the $SiO_2$ to RO molar ratios, 0.8 and 1.2 respectively. Within the linear boundaries of the contour plot, several partially elliptical contour bands of constant shunt resistance are illustrated. The bands range from about 3500 megaohms up to at least 7000 megaohms. Thus, the contour plot reveals that the ceramic material composition of the present invention enables production of a spark plug having a shunt resistance of at least 1000 megaohms at 1000 degrees Fahrenheit and, so far, most preferably, up to about 7000 megaohms at 1000 degrees Fahrenheit.

FIGS. 5 and 6 thus demonstrate that, based on the experimentation thus far conducted and disclosed herein, the optimized value of shunt resistance in the ceramic tends to follow the phase equilibrium line in the phase equilibrium diagram which extends between $CaO.SiO_2$ and $CaO.MgO.SiO_2$. Based on this experimentation, it is further believed that this discovery may be extrapolated entirely across the phase equilibrium diagram along the phase equilibrium line extending between $CaO.SiO_2$ and $MgO.SiO_2$. More specifically, optimized shunt resistance is believed to exist within a bandwidth of the above-described line that can be described as having a $SiO_2$ to RO molar ratio between about 0.8:1 and 1.2:1.

Based on the experimentation above, the preferred ranges of the constituent materials have been determined. A ceramic material including 90 to 99 percent by weight of alumina, 0.01 to 1 percent by weight of a zirconium-based compound, and 1 to 10% by weight of an oxide mixture of a glass former and a network modifier, wherein the preferred molar ratio of the glass former to the network modifier ranges between about 0.8:1 and 1.2:1. The zirconium-based compound is preferably zirconia ($ZrO_2$), but may also include various organic and inorganic compounds and/or complexes which contain zirconium. Zirconium containing compounds of the present invention may include any organic or inorganic compound or complex which contains zirconium and which enables zirconium to be incorporated into the oxide mixture matrix in the course of sintering the ceramic while also providing shunt resistance and dielectric puncture resistance consistent with the results presented herein with respect to the use of zirconia as the zirconium containing compound. As has been illustrated herein, zirconia may be utilized as the zirconium containing compound of the present invention. It may be utilized by itself or in conjunction with other zirconium containing compounds as described herein. It is believed that other zirconium containing compounds of the present invention may include, for example, inorganic zirconium compounds such as zirconium orthosilicate, zirconium sulfate, zirconium nitrate, zirconium phosphide, zirconium silicide, and zirconium sulfide, as well as various organic compounds and inorganic and organic complexes which contain zirconium. The zirconium containing compound should contain an amount of zirconium equivalent to 0.01-1.0% by weight of zirconia. Further, as discussed in the Manning patent, zirconium compounds generally contain some hafnium as an impurity. It is believed that hafnium and hafnia can be substituted interchangeably herein when referring to zirconium and zirconia, respectively, and that mixtures of zirconium-based and hafnium-based compounds may be utilized in place of zirconium-based compounds, all within the scope of the present invention. Preferably, the glass former is $SiO_2$ and the network modifier is CaO, MgO, SrO, and/or BaO, but may also include alkaline metal oxides such as $Na_2O$, $K_2O$, $Li_2O$ and the like. More specifically, the network modifier is preferably composed primarily of CaO and secondarily of MgO.

A more preferred range of materials includes the ceramic material having alumina in an amount between about 94 and about 97% by weight, zirconia in an amount between about 0.1 and about 0.5% by weight, and the oxide mixture of the glass former and network modifier in an amount between about 2.5 and about 5.9% by weight, wherein the molar ratio of said glass former to the network modifier equals between about 0.9:1 and 1.1:1, such that oxide mixture can be described by a molar equation as follows:

$$(Mg_V Ca_W Sr_X Ba_Y)O.ZSiO_2 \qquad (1)$$

wherein V+W+X+Y=1, and $0.8 \leq Z \leq 1.2$, and more preferably, wherein $0.9 \leq Z \leq 1.1$.

An even more preferred range includes the ceramic material having the alumina in an amount between about 95 and about 96.5% by weight, the zirconia in an amount between about 0.25 and about 0.35% by weight, and the oxide mixture in an amount between about 3.15 and about 4.75% by weight, wherein the network modifier includes CaO in an amount about 0.8 by mole fraction and MgO in an amount about 0.2 by mole fraction. The network modifier includes CaO in an amount between about 1.38 and about 1.95% by weight, and MgO in an amount between about 0.15 and about 0.43% by weight. The glass former comprises $SiO_2$ in an amount between about 1.87 to about 2.28% by weight.

In one specific embodiment, the ceramic material includes the alumina in an amount of about 95.67% by weight, the zirconia in an amount of about 0.31% by weight, and the oxide mixture in an amount of about 3.94% by weight. The oxide mixture includes CaO in an amount of about 1.55% by weight, MgO in an amount of about 0.27% by weight, and $SiO_2$ in an amount of about 2.12% by weight.

In another specific embodiment, the ceramic material includes the alumina in an amount of about 95.55% by weight, the zirconia in an amount of about 0.31%, CaO in an amount of about 2.04% by weight, $SiO_2$ in an amount of about 2.02% by weight, and no MgO.

In yet another specific embodiment, the ceramic material includes the alumina in an amount of about 95.84% by weight, CaO in an amount of about 2.05% by weight, $SiO_2$ in an amount of about 2.03% by weight, and no zirconia.

As discussed previously, network intermediates such as $Al_2O_3$ may be added to create alumino-silicate glass in order to further impede the motion of charge carriers. According to one preferred embodiment, $Al_2O_3$ in an amount as much as 40% by weight may be added to the oxide mixture. Also, the oxide mixture may be a calcium-alumino-silicate glass with up to 10% by weight of MgO or the other alkaline earth oxides added as network modifiers.

It is contemplated that the ceramic may also include various impurities, such as $K_2O$, $TiO_2$, $P_2O_5$, $Fe_2O_3$, and the like in a combined total amount of up to about between 0.01% and 0.50% by weight. Typically, however, such impurities are present in a combined total amount of about between 0.07% and 0.30%.

The experimentation reveals that a maximum in shunt resistance is achievable over a temperature range of 800 to 1200 degrees Fahrenheit when the molar ratio of $SiO_2$ to network modifier is about 1 to 1. Additionally, the shunt resistance is optimized when the ratio of CaO to RO is about 0.8 and when the amount of zirconia is about 0.3% by weight of the ceramic.

Further, it is believed that the zirconia not only improves the mechanical strength of the ceramic, but also improves the shunt resistance, by reducing crystallization within the matrix mixture when the ceramic is formed and cooled. Formation of a crystalline phase tends to result in an increase in conductivity of the oxide matrix mixture, and an attendant decrease in shunt resistance. When zirconia is added to the ceramic, at least a portion of the zirconia dissolves into the mixture of the glass former and network modifier and reduces crystallization thereof. Therefore, by reducing the crystallization within the oxide mixture matrix, the addition of zirconia tends to increase the shunt resistance. Nonetheless, despite the addition of zirconia, the oxide mixture matrix may contain some crystalline phases therein.

The ceramic material composition of the present invention enables the spark plug to be operated at higher voltages and at higher operating temperatures due to reduced susceptibility of dielectric failure of the material and increased shunt resistance of the material under such extreme conditions, thereby resulting in an attendant increase in shunt resistance of the spark plug.

The ceramic material composition of the present invention is resistant to dielectric breakdown whereby the integrity of the electrical resistivity of the material is maintained, to provide a spark plug with high shunt resistance.

The present invention also relates to ignition devices such as spark plugs, igniters, and other spark generation devices. A spark plug assembly 10 is illustrated in sectional view in FIG. 1. The spark plug 10 includes an outer shell 12 secured to an insulator 14. The outer shell 12 includes a ground electrode 18. The insulator 14 has a central bore 20 in which is situated a terminal 30, a conductive material 46, a sealing material 48, a center electrode 32. The center electrode 32 includes a tip 56 having a firing end 37 facing the ground electrode 18 with a spark gap 34 therebetween. From a terminal end 11 and extending toward a firing end 13, the spark plug insulator 14 includes a terminal portion 52, a large shoulder 56, a small shoulder 58, and a firing end portion or core nose 54. The insulator 14 is further formed with varying wall thicknesses between the inner surface 64 of the central bore 20 and the outer surface 66. The inner surface 64 defines a center bore seat 68 against which the center electrode 32 rests. The insulator 14 is formed from a material having approximately at least 88% by weight alumina ($Al_2O_3$) and up to 99.9% alumina, and more specifically at least 90% by weight alumina up to 99% alumina. The alumina may be present from about 94% to about 96% by weight of the ceramic. To help with the sintering process as well as improve the electrical and mechanical properties of the insulator 14, the insulator 14 is made from a material also containing one or more various metal oxides and a glass. The glass typically forms about 1-10% of the insulator.

The insulator 14 is designed to receive the electrically conductive center assembly 16 which is formed of the terminal 30, conductive material 46, sealing material 48, and center electrode 32. In operation, the center electrode 32 receives a high voltage ignition pulse from the ignition system (not shown) which travels along the center wire assembly 16 until it reaches the lower exposed end of the center electrode 32. If the pulse has sufficient energy to bridge the spark gap 102, a spark is formed between the center electrode 50 and the ground electrode 22. The ground electrode 22 is grounded to the engine (not shown). The spark ignites a fuel/air mixture which has previously been injected into a combustion chamber within the engine. The ignition of this fuel/air mixture initiates the combustion process used to power the engine.

The insulator 14 of the present invention is an alumina-based ceramic. In general, alumina-based ceramics comprise fine crystalline $Al_2O_3$ particles in an oxide mixture matrix. The oxide mixture is preferably a generally amorphous glass matrix, such as various types of silicate glasses, but may also include crystalline materials as part of the oxide mixture. The ceramic material for the insulator generally includes by weight 90 to 99% alumina. To improve shunt resistance and/or dielectric strength, the oxide mixture matrix is formed with a glass former, such as $SiO_2$ and includes at least Boron Oxide ($B_2O_3$), Phosphorus Oxide ($P_2O_5$), or a combination of Boron Oxide and Phosphorus Oxide. The oxide mixture matrix may also include other network modifiers, such as CaO, MgO, BaO, and SrO, alkaline earth metal oxides, or alkali metal oxides. The alkali metal oxides may include $Na_2O$, $K_2O$, and $Li_2O$. Other network intermediates such as $TiO_2$, ZnO, $ZrO_2$, and the like may be used in addition to $Al_2O3$.

The amorphous glass matrix is generally formed from Silicon Dioxide, however other glass formers may be used. The amorphous glass matrix may include other compounds, such as Calcium Oxide, Magnesium Oxide, Strontium Oxide, Barium Oxide, Aluminum Oxide, Zirconium Oxide, Phosphorus Oxide, Boron Oxide, Sodium Oxide, Lithium Oxide, Potassium Oxide, and similar oxides. The dielectric strength and shunt resistance of a ceramic material such as a spark plug insulator is improved through adding at least 0.05% Phosphorus Oxide by weight of the ceramic material or about greater than 1% by weight of the glass. The Phosphorus Oxide is added up to about 20% by weight of the glass and more preferably up to about 18% by weight of the glass, or up to about 1% by weight of the ceramic. In amounts over 20%, properties of the ceramic, which are desirable for a spark plug, may decrease, such as shunt resistance and dielectric strength. It has been found that the best balance of desirable features may be obtained when the glass includes approximately 1-18% Phosphorus Oxide and more preferably 2.5%-15% Phosphorus Oxide by weight of the glass. The highest shunt resistance values and dielectric strength values occur when the Phosphorus Oxide forms approximately 4-15% of the glass by weight and more preferably approximately 9% by weight.

Dielectric strength and shunt resistance of a ceramic, such as a spark plug insulator may be improved also by forming the ceramic with a glass including approximately 2.0% or greater Boron Oxide by weight of the glass. The glass may include Boron Oxide up to 11% by weight and more preferably up to 9% by weight. The inventors have found a good balance of desirable characteristics in a ceramic for a spark plug insulator that includes approximately 2.5% to 11% Boron Oxide by weight of the glass.

Figure 7:
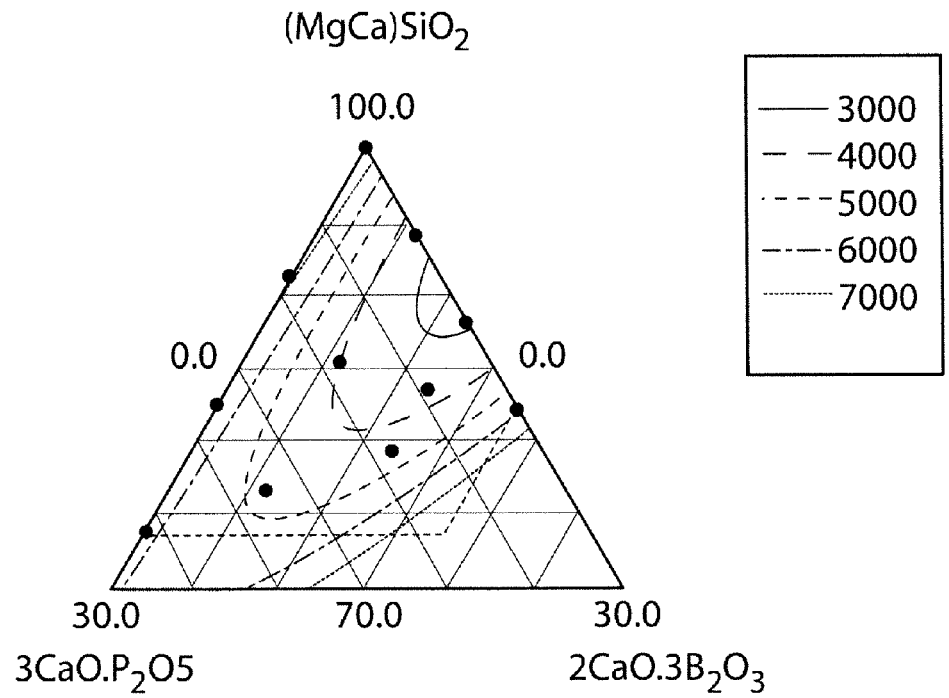
FIG. 7 is a mixture contour plot of shunt resistance of insulator at 1000° Fahrenheit.
Figure 8:
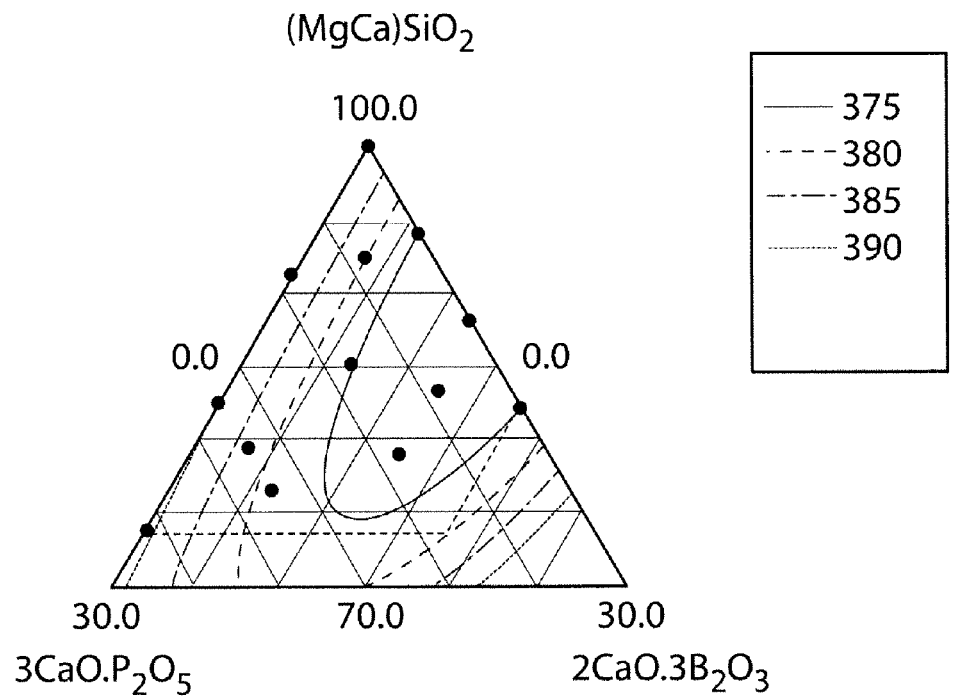
FIG. 8 is a mixture contour plot of dielectric strength.
Figure 9:
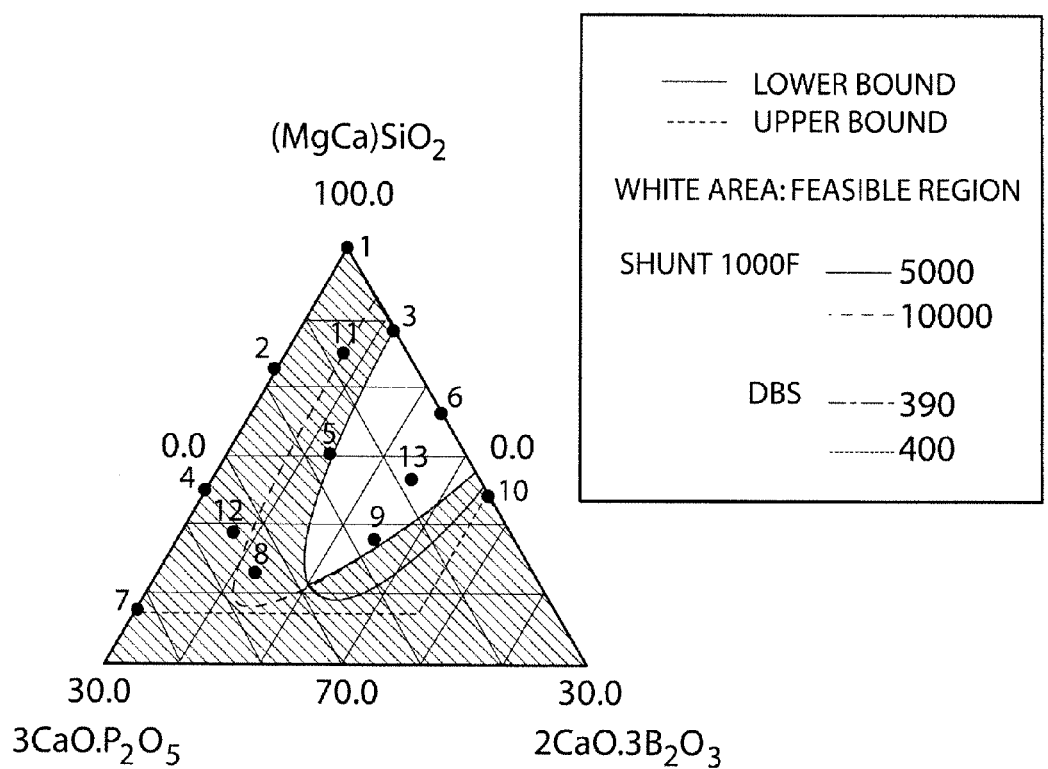
FIG. 9 is an overload mixture contour plot of the shunt resistance and dielectric strength.
Figure 10:
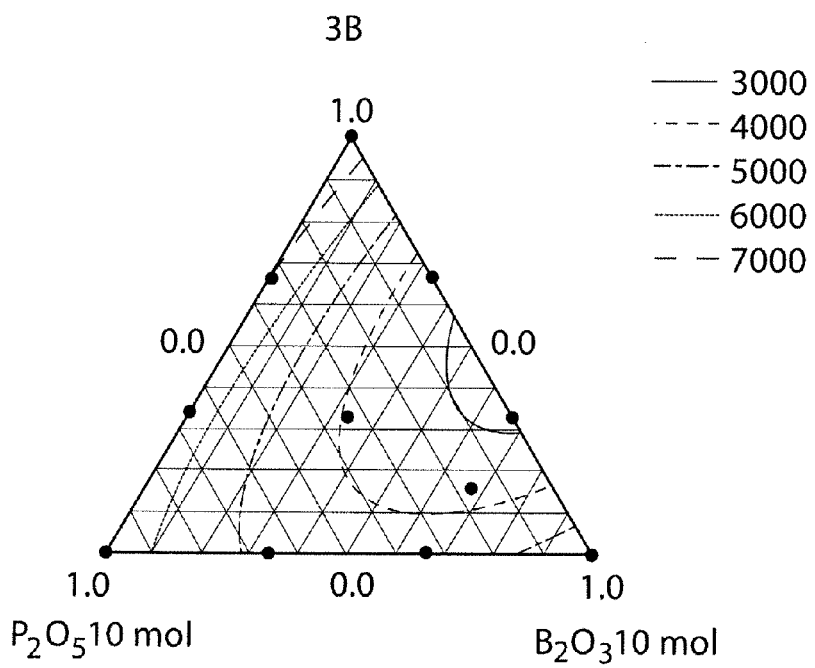
FIG. 10 is a mixture contour plot of shunt resistance at 1000° Fahrenheit.
Figure 11:
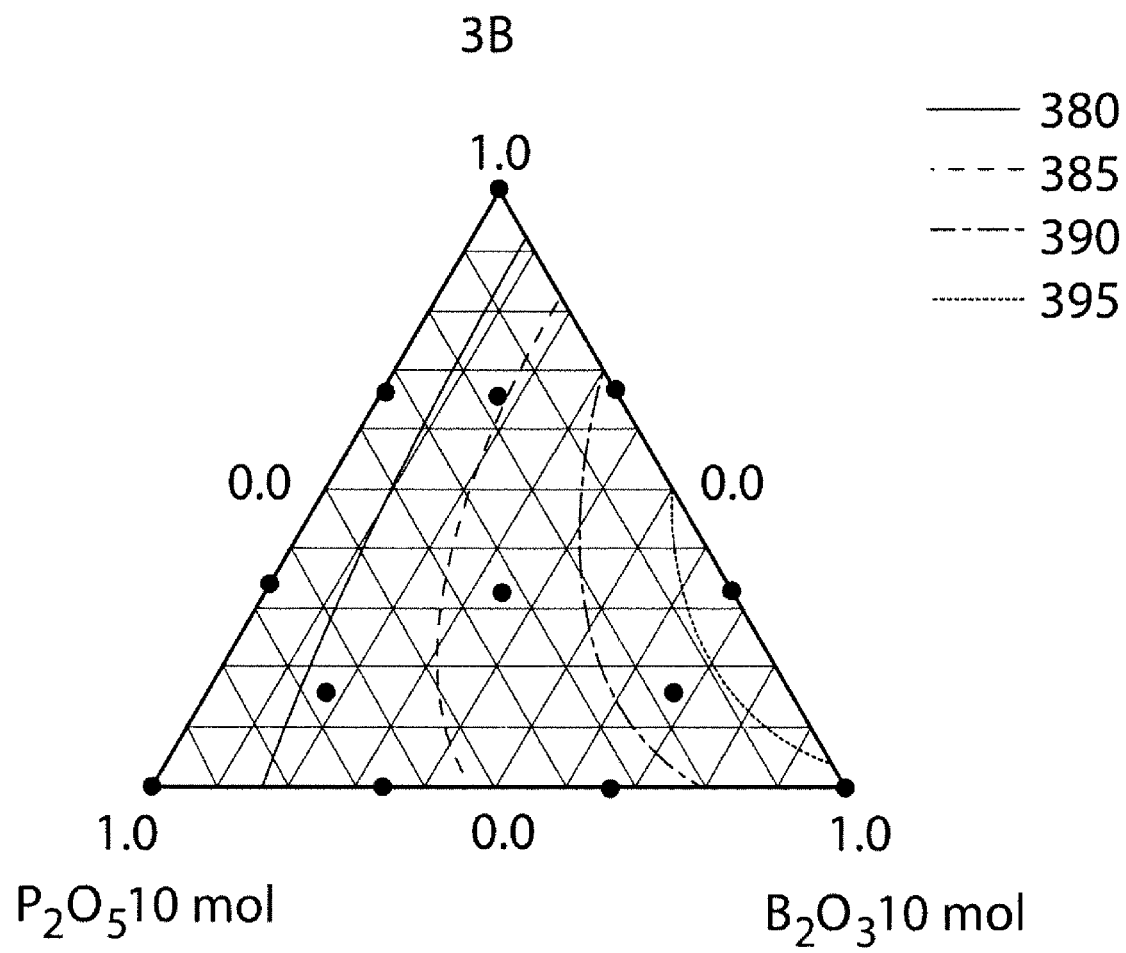
FIG. 11 is a mixture contour plot of dielectric strength.
Figure 12:
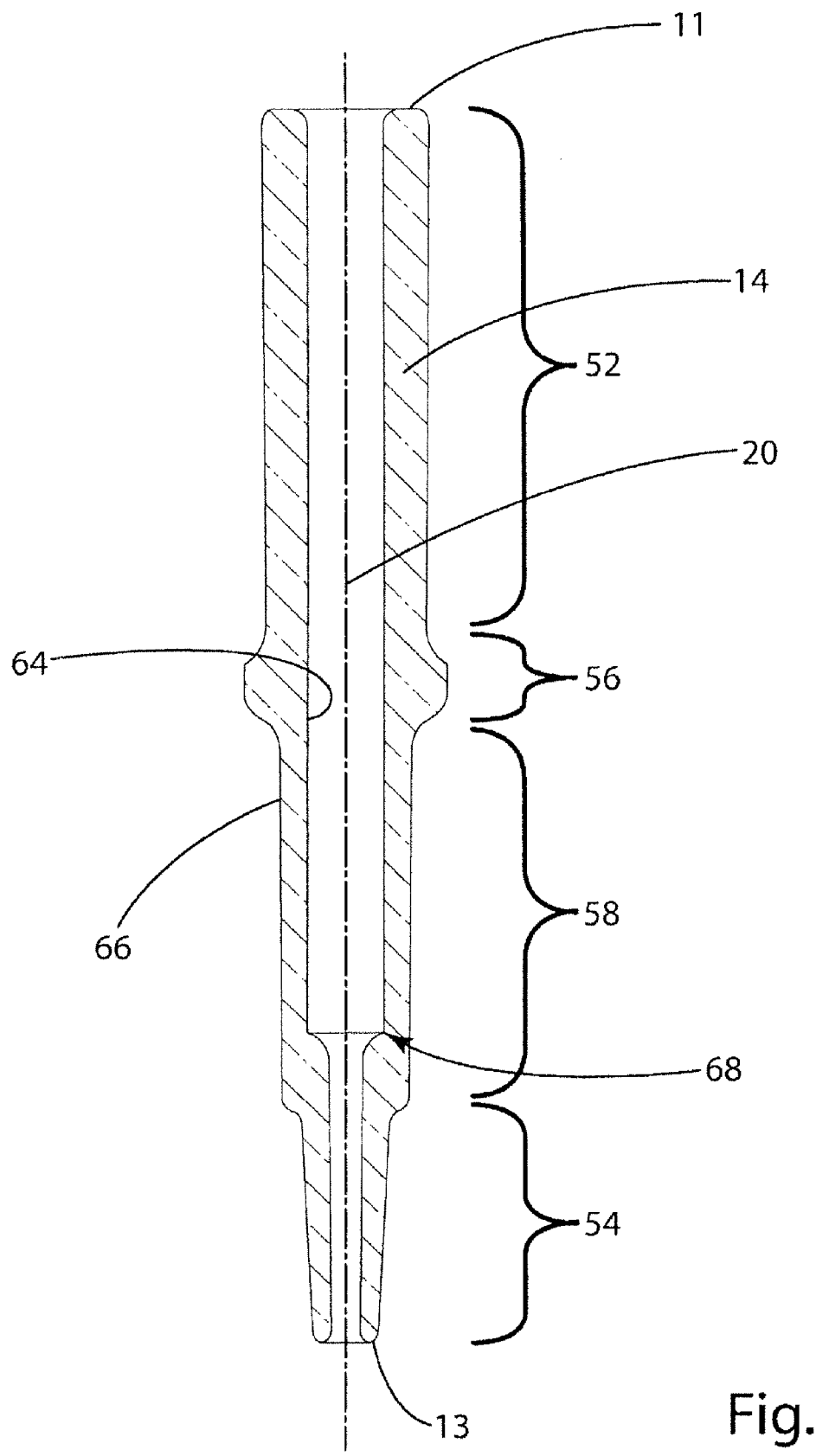
FIG. 12 is a sectional view of a spark plug insulator.

Dielectric strength and shunt resistance of a ceramic, such as a spark plug insulator may be further improved by using both Boron Oxide and Phosphorus Oxide in the glass as may be seen in Table 5 below. The glass generally includes approximately 0.5%-20% Phosphorus Oxide and 2.0% to 11% Boron Oxide by weight of the glass. The glass forms approximately up to 12% of the ceramic material. As may be seen in Table 5, the Dielectric strength and shunt resistance peak when about 10% by weight Phosphorus Oxide of the glass is added and about 4.5% by weight Boron Oxide of the glass is added. The mixture contour plots, of FIGS. 7-11 and especially FIG. 9 show the optimal ranges for shunt resistance and dielectric strength of a ceramic material. FIGS. 7-9 use a (MgCa) $SiO_2$ glass matrix, while FIGS. 10 and 11 use a 3B glass matrix. The term 3B in the Figures refers generally to a glass matrix having $Mg_{0.2}Ca_{0.8}SiO_2$. A 3B ceramic may also include alumina in an amount of about 95-96% and more specifically about 95.67% by weight; the zirconia in an amount of about 0.2-0.4% by weight and more specifically about 0.31% by weight; and the oxide mixture in an amount of about 3-5% and more specifically about 3.94% by weight. The oxide mixture generally includes CaO in an amount of about 1-2% and more specifically about 1.55% by weight; MgO in an amount of about 0.1-0.4% by weight and more specifically about 0.27% by weight; and $SiO_2$ in an amount of about 1.5-2.5% and more specifically about 2.12% by weight. The "ID Number" in Column 1 of Table 5 refers to an insulator with compositions approximately as calculated and shown in Table 6. Table 7 and 8 provide further information regarding the compositions used to form the ceramic. Table 9 provides approximate Molar Percentages in Terms of End Members.

TABLE 5

Data Summary

| ID Number | (MgCa)SiO$_2$ Mol % | 3CaO•P$_2$O$_5$ Mol % | 2CaO•3B$_2$O$_3$ Mol % | Apparent Density (g/cc) | Shunt Resistance at 1000° F. M-ohms | Dielectric Strength V/mil (rms) |
|---|---|---|---|---|---|---|
| 1 | 100.0 | 0.0 | 0.0 | 3.793 | 2500* | 376 |
| 2 | 91.3 | 8.7 | 0.0 | 3.792 | 2994 | 375 |
| 3 | 94.1 | 0.0 | 5.9 | 3.803 | 4859 | 388 |
| 4 | 82.6 | 17.4 | 0.0 | 3.782 | 2370 | 372 |
| 5 | 85.4 | 8.7 | 5.9 | 3.789 | 8245 | 399 |
| 6 | 88.1 | 0.0 | 11.9 | 3.793 | 7468 | 393 |
| 7 | 73.9 | 26.1 | 0.0 | 3.765 | 3555 | 377 |
| 8 | 76.7 | 17.4 | 5.9 | 3.773 | 5418 | 390 |
| 9 | 79.4 | 8.7 | 11.9 | 3.784 | 3971 | 391 |
| 10 | 82.2 | 0.0 | 17.8 | 3.792 | 4420 | 391 |
| 11 | 92.6 | 4.4 | 3.0 | 3.786 | * | 389 |
| 12 | 79.6 | 17.4 | 3.0 | 3.774 | * | 372 |
| 13 | 83.7 | 4.4 | 11.9 | 3.788 | 6547 | 392 |

*Data not available due to difficulties making insulators. For #1, typical 3B data was used.

TABLE 6

Batch Information
Calculated Composition

| ID Number | Alumina wgt % | ZrO$_2$ wgt % | MgO wgt % | CaO wgt % | P$_2$O$_5$ wgt % | B$_2$O$_3$ wgt % | SiO$_2$ wgt % |
|---|---|---|---|---|---|---|---|
| 1 | 95.79 | 0.31 | 0.27 | 1.51 | 0.00 | 0.00 | 2.12 |
| 2 | 95.47 | 0.31 | 0.25 | 1.73 | 0.31 | 0.00 | 1.93 |
| 3 | 95.71 | 0.31 | 0.26 | 1.53 | 0.00 | 0.18 | 2.02 |
| 4 | 95.15 | 0.30 | 0.22 | 1.95 | 0.62 | 0.00 | 1.75 |
| 5 | 95.39 | 0.31 | 0.23 | 1.75 | 0.31 | 0.18 | 1.83 |
| 6 | 95.63 | 0.31 | 0.24 | 1.55 | 0.00 | 0.35 | 1.91 |
| 7 | 94.83 | 0.30 | 0.20 | 2.17 | 0.94 | 0.00 | 1.56 |
| 8 | 95.07 | 0.30 | 0.21 | 1.97 | 0.62 | 0.18 | 1.64 |
| 9 | 95.31 | 0.30 | 0.22 | 1.77 | 0.31 | 0.35 | 1.73 |
| 10 | 95.54 | 0.31 | 0.23 | 1.58 | 0.00 | 0.53 | 1.81 |
| 11 | 95.59 | 0.31 | 0.25 | 1.63 | 0.16 | 0.09 | 1.98 |
| 12 | 95.11 | 0.30 | 0.22 | 1.96 | 0.62 | 0.09 | 1.70 |
| 13 | 95.47 | 0.31 | 0.23 | 1.66 | 0.16 | 0.35 | 1.82 |

TABLE 7

Batch Information
Batches Used

| ID Number | Talc wgt % | Calcium Carbonate wgt % | Calcium Phosphate wgt % | Calcium Borate wgt % | EPK wgt % | Alumina wgt % | Zirconia wgt % |
|---|---|---|---|---|---|---|---|
| 1 | 0.88 | 2.72 | 0.00 | 0.00 | 3.35 | 92.75 | 0.30 |
| 2 | 0.80 | 2.48 | 0.66 | 0.00 | 3.06 | 92.70 | 0.30 |
| 3 | 0.84 | 2.58 | 0.00 | 0.37 | 3.19 | 92.72 | 0.30 |
| 4 | 0.73 | 2.24 | 1.31 | 0.00 | 2.77 | 92.65 | 0.30 |
| 5 | 0.76 | 2.35 | 0.66 | 0.37 | 2.90 | 92.67 | 0.30 |
| 6 | 0.79 | 2.45 | 0.00 | 0.73 | 3.02 | 92.70 | 0.30 |
| 7 | 0.65 | 2.01 | 1.97 | 0.00 | 2.48 | 92.59 | 0.30 |
| 8 | 0.68 | 2.11 | 1.31 | 0.37 | 2.61 | 92.62 | 0.30 |
| 9 | 0.72 | 2.21 | 0.66 | 0.73 | 2.73 | 92.65 | 0.30 |
| 10 | 0.75 | 2.32 | 0.00 | 1.10 | 2.86 | 92.67 | 0.30 |
| 11 | 0.82 | 2.53 | 0.33 | 0.18 | 3.12 | 92.71 | 0.30 |
| 12 | 0.71 | 2.18 | 1.31 | 0.18 | 2.69 | 92.63 | 0.30 |
| 13 | 0.76 | 2.33 | 0.33 | 0.73 | 2.88 | 92.67 | 0.30 |

TABLE 8

Batch Information
Unity Formula Of Glass

| ID Number | MgO Moles | CaO Moles | P$_2$O$_5$ Moles | B$_2$O$_3$ Moles | SiO$_2$ Moles |
|---|---|---|---|---|---|
| 1 | 0.20 | 0.80 | 0.00 | 0.00 | 1.06 |
| 2 | 0.17 | 0.83 | 0.05 | 0.00 | 0.91 |
| 3 | 0.19 | 0.81 | 0.00 | 0.08 | 1.01 |
| 4 | 0.14 | 0.86 | 0.10 | 0.00 | 0.76 |
| 5 | 0.16 | 0.84 | 0.05 | 0.08 | 0.85 |
| 6 | 0.18 | 0.82 | 0.00 | 0.15 | 0.95 |
| 7 | 0.11 | 0.89 | 0.15 | 0.00 | 0.60 |
| 8 | 0.13 | 0.87 | 0.10 | 0.08 | 0.70 |
| 9 | 0.15 | 0.85 | 0.05 | 0.15 | 0.80 |
| 10 | 0.17 | 0.83 | 0.00 | 0.23 | 0.90 |
| 11 | 0.18 | 0.82 | 0.03 | 0.04 | 0.96 |
| 12 | 0.14 | 0.86 | 0.10 | 0.04 | 0.73 |
| 13 | 0.17 | 0.83 | 0.03 | 0.15 | 0.88 |

TABLE 9

Molar Percentage In Terms Of End Members

| ID Number | (MgO$_{0.2}$CaO$_{0.8}$)SiO$_2$ Mol % | 3CaO•P$_2$O$_5$ Mol % | 2CaO•3B$_2$O$_3$ Mol % |
|---|---|---|---|
| 1 | 100.0 | 0.0 | 0.0 |
| 2 | 91.3 | 8.7 | 0.0 |
| 3 | 94.1 | 0.0 | 5.9 |
| 4 | 82.6 | 17.4 | 0.0 |
| 5 | 85.4 | 8.7 | 5.9 |
| 6 | 88.1 | 0.0 | 11.9 |
| 7 | 73.9 | 26.1 | 0.0 |
| 8 | 76.7 | 17.4 | 5.9 |
| 9 | 79.4 | 8.7 | 11.9 |
| 10 | 82.2 | 0.0 | 17.8 |
| 11 | 92.6 | 4.4 | 3.0 |
| 12 | 79.6 | 17.4 | 3.0 |
| 13 | 83.7 | 4.4 | 11.9 |

As shown in the tables, the optimum range is about 0.08 to 0.15 moles of B$_2$O$_3$ and less than 0.10 moles of P$_2$O$_5$. In terms of overall formulation, the range is approximately 0.18 to 0.35% by weight Boron Oxide and up to 0.62% by weight Phosphorus Oxide.

Obviously, many modifications and variations of the present invention are possible in light of the above teachings.

It is, therefore, to be understood that within the scope of the appended claims, the invention may be practiced otherwise than as specifically described. The invention is defined by the claims.

What is claimed is:

1. A spark plug having an insulator, the insulator comprising:
    alumina in an amount of approximately 90 to 99% by weight of the insulator; and
    a glass including about 1% to 18% Phosphorus Oxide by weight of the glass.

2. The spark plug of claim 1 wherein the glass includes by weight approximately 2.5% to 15% Phosphorus Oxide.

3. A spark plug having an insulator, the insulator comprising:
    alumina in an amount of approximately 90 to 99% by weight of the insulator; and
    a glass including about 0.05% or greater Phosphorus Oxide by weight of the glass and greater than 0.5% Boron Oxide by weight of the glass.

4. The spark plug of claim 3 wherein the glass includes by weight greater than 1% Boron Oxide.

5. The spark plug insulator of claim 3 wherein the glass includes by weight less than 15% Boron Oxide.

6. The spark plug of claim 5 wherein the glass includes by weight about 2.5% to 11% Boron Oxide.

7. The spark plug of claim 6 wherein the glass includes by weight approximately 4 to 6% Boron Oxide.

8. The spark plug of claim 7 wherein the glass includes by weight approximately 5.5% Boron Oxide.

9. A spark plug having an insulator, the insulator comprising:
    alumina in an amount of approximately 90 to 99% by weight of the insulator; and
    a glass including Phosphorus Oxide and approximately 2.5% to 11% Boron Oxide by weight of the glass.

10. The spark plug of claim 9 wherein the glass includes by weight Phosphorus Oxide in the amount of approximately 1.0% to 18%.

11. The spark plug of claim 10 wherein the glass includes by weight Phosphorus Oxide in the amount of approximately 9% and Boron Oxide in the amount of approximately 4-6%.

* * * * *